United States Patent [19]

Myers

[11] Patent Number: 5,535,636
[45] Date of Patent: Jul. 16, 1996

[54] GAUGE FOR MEASURING OBJECTS ACCESSIBLE TO SMALL CHILDREN

[76] Inventor: Carrie Myers, 343 Apex St., North Fort Meyers, Fla. 33903

[21] Appl. No.: 537,401

[22] Filed: Oct. 2, 1995

[51] Int. Cl.$^6$ .................................................. G01N 15/00
[52] U.S. Cl. ........................................ 73/865.5; 33/555.2
[58] Field of Search ........................... 73/865.5, 865.6, 73/866, 865.9, 432.1; 33/511, 512, 514.1, 555.1, 555.2, 501.45, 501.05, 501.08

[56] References Cited

U.S. PATENT DOCUMENTS

| | | | |
|---|---|---|---|
| 438,453 | 10/1890 | Wareham et al. | 33/514.1 |
| 1,062,525 | 5/1913 | Ward | 33/514.1 X |
| 2,896,333 | 7/1959 | Kivela | 33/555.2 X |
| 3,703,234 | 11/1972 | Howard | 33/555.2 X |
| 3,785,097 | 10/1973 | Woelich | 33/555.2 |
| 3,874,085 | 4/1975 | Atkins | 33/555.2 X |
| 5,197,465 | 3/1993 | Montgomery | 33/512 X |
| 5,351,410 | 10/1994 | Hainneville | 33/552.2 X |
| 5,471,756 | 12/1995 | Bolanos et al. | 333/501.45 |

Primary Examiner—Brian Zimmerman
Assistant Examiner—Elizabeth L. Dougherty
Attorney, Agent, or Firm—William E. Noonan

[57] ABSTRACT

A gauge for measuring objects accessible to small children. The gauge includes a generally tubular member that simulates a human trachea. A series of spaced-apart, annular ribs are arranged along the tubular member for simulating cartilage formed about the human trachea. A pair of the annular ribs are formed at respective ends of the tubular member. The annular ribs are inflexible in response to manual forced being exerted thereon. Each rib has formed therethrough an opening of a predetermined diameter that represents the diameter of a human trachea. The rib sections permit relatively small objects, having a diameter equal to or less than the predetermined diameter to pass through the tubular member. This indicates that such relatively small objects are unsafe for a small child. The annular rib sections block objects larger than the predetermined diameter from passing through the tubular member to indicate that such larger objects cannot be accidentally introduced into the child's trachea.

6 Claims, 3 Drawing Sheets

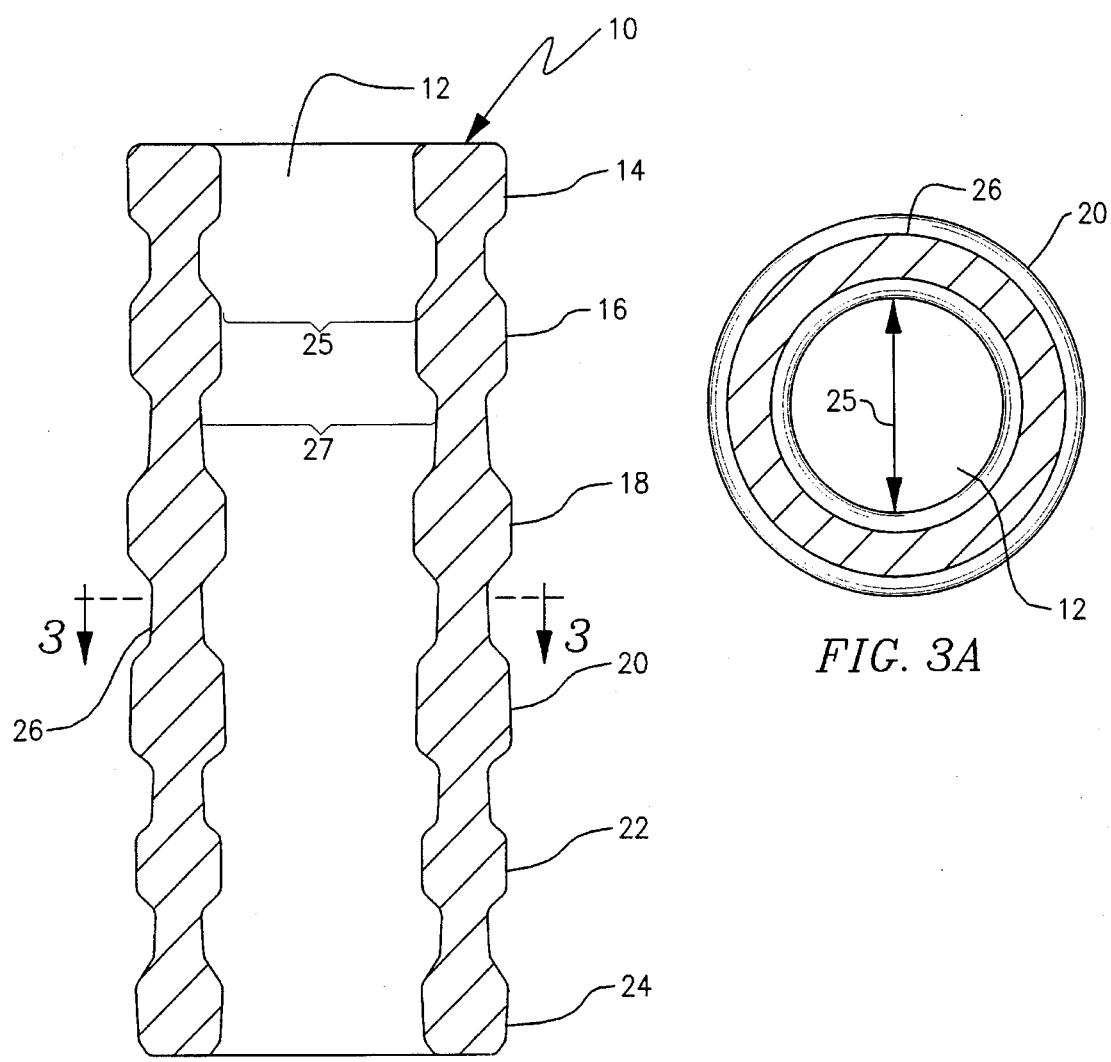
FIG. 2
FIG. 3A
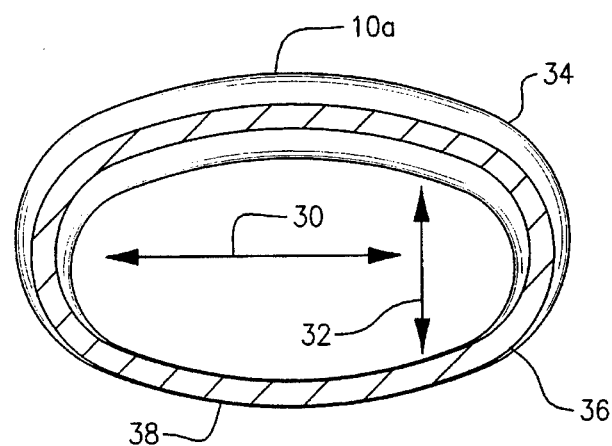
FIG. 3B

GAUGE FOR MEASURING OBJECTS ACCESSIBLE TO SMALL CHILDREN

FIELD OF THE INVENTION

This invention relates to a gauge for determining whether selected objects are safe or dangerous for small children and, more particularly, to a breathing gauge that determines whether or not such objects may accidentally be introduced into the child's trachea.

BACKGROUND OF THE INVENTION

Infants and toddlers often exhibit the dangerous habit of placing small items into their mouths. If such an object is small enough, it may be accidentally swallowed by the child or inhaled into his or her windpipe. If a foreign object becomes lodged in a child's trachea, a life-threatening emergency can result. To avoid such emergencies, objects compressible to or smaller than the maximum diameter of an average child's windpipe should be kept out of reach of the child. Research has revealed that the average human trachea is approximately 1" in diameter. Accordingly, for utmost safety, items smaller than or compressible to about an inch should be inaccessible to a small child. This size may be reduced somewhat for infants and very young children having small, underdeveloped trachea. To date no products are available for quickly and reliably testing these items before they are placed within a child's reach.

SUMMARY OF INVENTION

It is therefore an object of this invention to provide a gauge for quickly and accurately measuring objects that are accessible to a small child and determining whether or not such objects may be introduced into the child's windpipe.

It is a further object of this invention to provide a breathing gauge that closely simulates the human trachea so that a parent or guardian may reliably test various selected objects for size before they are made accessible to a small child.

It is a further object of this invention to provide a gauge for measuring object accessible to small children, which is relatively inexpensive to manufacture and easy to use.

It is a further object of this invention to provide a gauge that helps to avoid asphyxiation and other medical emergencies resulting from accidental introduction of a small item into a child's windpipe.

This invention relates to a gauge for measuring objects accessible to small children. The gauge includes a generally tubular member that simulates a human trachea and has a series of spaced apart, annular ribs that are arranged along the tubular member for simulating cartilage about the human trachea. A pair of the annular ribs are formed at respective ends of the tube. Each annular rib is inflexible in response to manual force being exerted thereon and has formed therethrough an opening of a predetermined diameter that represents the diameter of a human trachea. The annular rib sections permit relatively small objects, having a size equal to or less than the predetermined diameter, to pass through the tubular member thereby indicating that the relatively small objects may be introduced into the child's trachea and should be made inaccessible to the child. The annular ribs block relatively large objects having a size larger than the predetermined diameter, from passing through the tubular member. This indicates that the relatively large objects cannot be accidentally introduced into the child's trachea.

In a preferred embodiment, the predetermined diameter is at least 1.25". Preferably, the diameter is no greater than 2". A narrower preferred range for the predetermined diameter is at least 1.5" and no greater than 1.75". For very young children a tubular member having a diameter of less than one inch may be employed. The length of the tubular member is preferably at least 3" and not greater than 6".

This invention also features a method of measuring the size of an object to determine if the object is safe from accidental introduction into a small child's trachea. This method includes providing a generally tubular member that simulates the human trachea and is inflexible in response to manual force being exerted thereon. An interior opening is formed through the tubular member and the interior opening has a predetermined diameter that represents the diameter of a human trachea. An attempt is then made to pass an object to be measured through the opening of the tubular member. Objects that are small than or equal in size to the predetermined maximum diameter pass through the tubular member to indicate that such objects may be accidentally introduced into the child's trachea. An object greater than the predetermined diameter is blocked from passing through the tubular member to indicate that the object cannot be accidentally introduced into the child's trachea.

DETAILED DESCRIPTION OF PREFERRED EMBODIMENTS

Other objects, features and advantages will occur from the following description of preferred embodiments and the accompanying drawings, in which:

FIG. 2 is a cross sectional view of the gauge of FIG. 1;

FIG. 3A is a cross sectional view of the gauge taken along line 3—3 of FIG. 2;

FIG. 3B is a view, similar to FIG. 3A, of an alternative preferred gauge having an oblong or non-circular cross section;

Figures 4, 5:
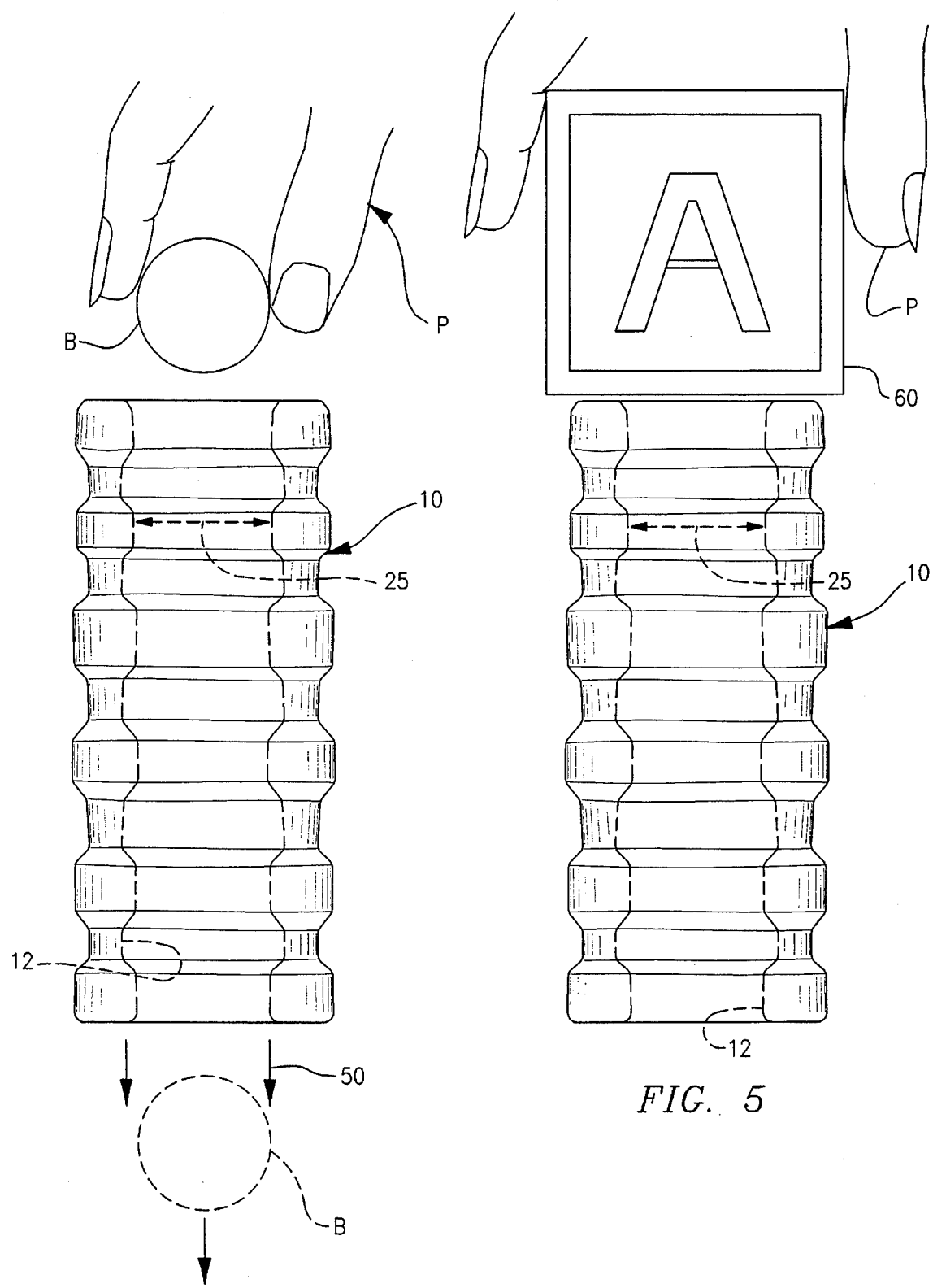

FIG. 4 is an elevational side view of the gauge in use, with an object smaller than the predetermined diameter being passed through the gauge, thereby indicating that such an object may become accidentally lodged in a child's windpipe; and FIG. 5 is a view similar to FIG. 4 of the gauge and a child's block that is larger than the predetermined diameter and unable to pass through the gauge, thereby indicating that the block will not become accidentally lodged in the child's windpipe.

Figure 1:
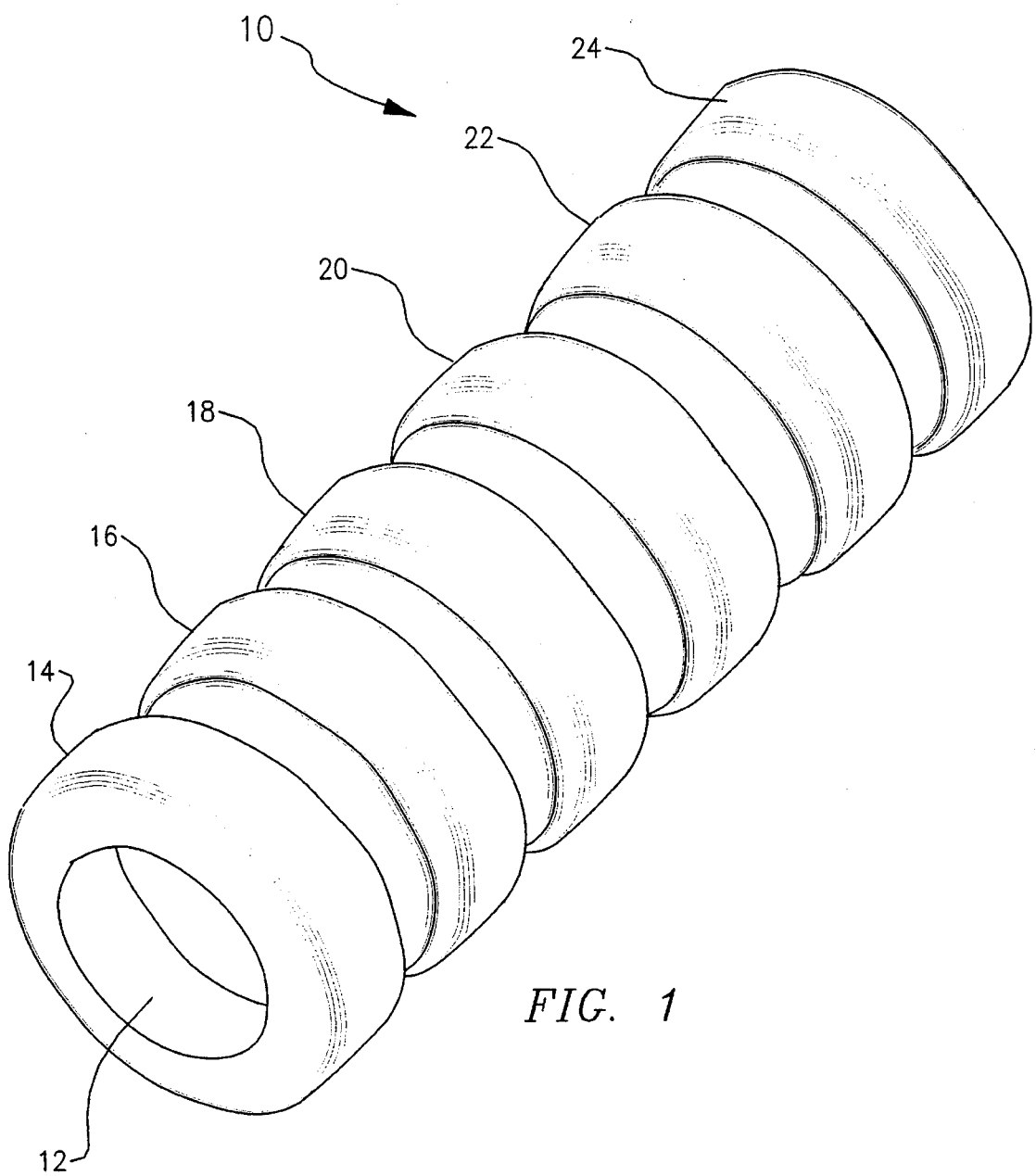
FIG. 1 is a perspective view of a gauge for measuring objects accessible to small children in accordance with this invention.

There is shown in FIG. 1 a breathing gauge 10 for testing selected objects that are accessible to an infant, toddler or other small child. The gauge comprises an elongate, generally tubular member that resembles the human trachea. Gauge 10 is approximately 3"–6" in length and has a central opening 12 with a diameter of between 1.25" and 2". In preferred embodiments, the diameter is at least 1.5" and no greater than 1.75". The average human trachea has a diameter of approximately 1" and a small child's trachea is somewhat smaller than this. Accordingly, a diameter of at least 1.25" provides an ample margin of safety so that items which are even close to a size that may fit in a child's trachea are effectively screened and made inaccessible to the small child. Gauge 10 is composed of a relatively stiff and durable material. Preferably the gauge features a molded construction. PVC, various plastics and assorted elastomeric substances may be employed.

The invention also covers tubular members having a central opening that is less than 1.25" in diameter. Such devices are used for testing items to be given to very small children and infants having immature trachea.

As shown in FIGS. 1 and 2, gauge 10 includes a series of spaced apart annular ribs 14, 16, 18, 20, 22 and 24 that are arranged along the tubular gauge. These ribs simulate the cartilage that is formed about the human trachea. As best shown in FIG. 3A, each rib, represented by rib 20, is disposed adjacent a relatively thin section 26. The diameter of tubular opening 12 is determined by the interior diameter 25, FIG. 2, of ribs 14–24. This diameter defines the largest objects that will fit through gauge 10. As explained above, the diameter 25 is preferably at least 1.25" and no greater than 2". The interior diameter 27 of each relatively thin segment 26 is somewhat greater than diameter 25. A pair of the annular ribs 14 and 24 are formed at respective ends of gauge 10. As a result, the minimum diameter 25 is formed at those ends. Objects larger than this diameter are prevented from being introduced into opening 12 of gauge 10.

The annular ribs are relatively inflexible in response to a manual bending or stretching force being applied to them. This means that the interior diameter 25 of each rib cannot be expanded or contracted when a person or child steps upon, pulls, stretches or throws or otherwise handles the gauge. It is critical that the ribs be relatively inflexible so that the sizes of selected objects can be accurately determined. This helps to prevent dangerously small items from being inadvertently given or otherwise made accessible to the child.

In the embodiment shown in FIGS. 1–3A, gauge 10 has a generally circular cross sectional shape. However, in alternative embodiments, the gauge may have an oblong, elliptical or other non-circular shape to more closely resemble the actual shape of the human trachea. Such an embodiment is disclosed in FIG. 3B. Therein, alternative gauge 10a includes a major diameter 30 and a minor diameter 32. As in the prior embodiment, there are a plurality of generally annular ribs 34 arranged along gauge 10a. Ribs 34 alternate with relatively thin tubular sections 36. Each rib 34 narrows proximate the front 38 of gauge 10a such that it has a thickness that is no greater than the thickness of section 36. This simulates the construction of an actual human trachea. Therein, the annular cartilage sections taper to a pair of spaced apart ends proximate the front of the trachea. Those ends are connected by smooth muscle and connective tissue. The front portion 38 of each rib 34, which front portion is no thicker than the adjacent area of section 36, represents this tissue and muscle. In the embodiment of FIG. 3B, major diameter 30 is the smallest acceptable size for an object that will be accessible to a small child.

Gauge 10 is utilized in the manner shown in FIGS. 4 and 5. To determine whether a particular object is safe to be given to an infant, toddler or other small child, the parent, guardian or other person supervising the child attempts to insert the object through the tubular gauge. In FIG. 4, person P is introducing a ball B into gauge 10. The ball has a diameter that is smaller than interior diameter 25. Gauge 10 is positioned vertically and the ball is dropped. Because the diameter of the ball is smaller than the minimum interior diameter of gauge 10, the ball falls completely through opening 12 and drops out of the gauge in the direction of arrows 50. This indicates that ball B has a diameter less than the diameter 25 (e.g. less than 1.25"–1.5" depending upon the actual diameter of the gauge). There is a risk that such a small item may be accidentally lodged in the child's windpipe. Accordingly, this indicates to person P that ball B should be kept out of the child's reach.

In contrast, as illustrated in FIG. 5 when person P attempts to pass a child's block 60 through gauge 10, the relatively large size of the block prevents it from being introduced into opening 12. Block 60 is larger than gauge opening diameter 25. Accordingly, the block in unable to pass through gauge 10. This indicates that it would not be possible to accidentally introduce block 60 into a child's trachea. The block cannot be accidentally inhaled. Therefore, assuming the object is not pointed, sharp, poisonous or hazardous in some other manner, it should be safe for the child to handle.

It should be noted that similar results will apply if person P attempts to introduce items through the opposite end of gauge 10. The gauge is symmetrically constructed so that it features a fail-safe operation. It does not matter through which end a person attempts to introduce an object. Because the interior diameter 25 is located at each end, the item will either pass through the gauge or be blocked in either direction.

A similar technique is used to test objects using the alternative gauge of FIG. 3B. In that embodiment, acceptable items are those that do not pass through the gauge regardless of the orientation at which their introduced into the gauge. The minimum size of an object that is acceptable for handling by the child is larger than the predetermined maximum diameter 30.

Accordingly, this invention features a gauge that closely simulates the appearance of the human trachea and that quickly and accurately determines whether any particular object may be accidentally inhaled by a small child. The anatomically correct construction of this invention provides the parent or guardian with improved piece of mind, confidence and a sense of security against life-threatening emergencies.

The invention may be marketed either individually or as part of a kit or series of gauges. A single tubular member having an inside diameter of 1.25" or greater provides accurate testing for small children of all ages and stages of development. Alternatively, a kit or series of smaller tubular members allows the parent to increase the size of the gauge as the child matures and his or her trachea increases in diameter.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A gauge for measuring object accessible to small children, said gauge comprising:

a generally tubular member that simulates a human trachea and includes a series of spaced apart, annular ribs arranged along said tubular member for simulating cartilage formed about the human trachea;

a pair of said annular ribs being formed at respective ends of said tubular member, said annular ribs being inflexible in response to manual force being exerted thereon and having formed therethrough an opening of a predetermined diameter that represents the diameter of a human trachea; whereby said annular rib sections permit relatively small objects, having a size equal to or less than said predetermined diameter, to pass through said tubular member, which indicates that said relatively small objects should be made inaccessible to a small child, and block objects larger than said predetermined diameter from passing through said tubular member, which indicates that said larger objects will avoid accidental introduction into the child's trachea.

2. The gauge of claim 1 in which said predetermined diameter is at least 1.25".

3. The apparatus of claim 1 in which said predetermined diameter is not greater than 2".

4. The gauge of claim 1 in which said predetermined diameter is at least 1.5" and no greater than 1.75".

5. The gauge of claim 1 in which said tubular member has a length of at least 3" but no greater than 6".

6. A method of measuring the size of objects to determine if such objects may be introduced into a small child's trachea, said method comprising the steps of:

providing a generally tubular member that simulates a human trachea and is inflexible in response to manual force being exerted thereon;

forming through said tubular member an interior opening of a predetermined diameter that represents the diameter of a human trachea; and attempting to pass through said opening of said tubular member an object to be measured, whereby an object that is less than or equal to said predetermined diameter passes through said tubular member to indicate that there is a risk that said object may be introduced into the child's trachea and should be made inaccessible to said child, and an object greater than said predetermined diameter is blocked from passing through said tubular member to indicate that said object cannot be accidentally introduced into the child's trachea.

* * * * *